United States Patent
Kim et al.

(10) Patent No.: US 9,012,067 B2
(45) Date of Patent: Apr. 21, 2015

(54) METHOD FOR BATTERY CELL OF NOVEL STRUCTURE

(71) Applicant: LG Chem, Ltd., Seoul (KR)

(72) Inventors: Hee Gyu Kim, Cheongwon-gun (KR); Sooryoung Kim, Cheongwon-gun (KR); Jung Hwan Kim, Cheongju-si (KR); Geon Tae Park, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/296,737

(22) Filed: Jun. 5, 2014

(65) Prior Publication Data

US 2014/0287279 A1 Sep. 25, 2014

Related U.S. Application Data

(63) Continuation of application No. PCT/KR2013/000582, filed on Jan. 25, 2013.

(30) Foreign Application Priority Data

Feb. 7, 2012 (KR) .......................... 10-2012-0012096

(51) Int. Cl.
*H01M 2/02* (2006.01)
*H01M 2/04* (2006.01)
(Continued)

(52) U.S. Cl.
CPC .......... *H01M 2/0217* (2013.01); *H01M 2/0473* (2013.01); *H01M 2/02* (2013.01); *H01M 2/0285* (2013.01); *H01M 2/0292* (2013.01); *H01M 10/049* (2013.01); *H01M 2/34* (2013.01)

(58) Field of Classification Search
CPC ....... H01M 2/02; H01M 2/0217; H01M 2/04; H01M 2/0473

USPC ............... 429/7, 52, 133, 136, 153, 163, 176, 429/179; 29/623.1, 623.5
See application file for complete search history.

(56) References Cited

U.S. PATENT DOCUMENTS 3,723,258 A * 3/1973 Podell et al. .................. 205/124
2003/0070935 A1 * 4/2003 Dolan ........................... 205/321
(Continued)

FOREIGN PATENT DOCUMENTS

| KR | 10-2008-0018476 A | 2/2008 |
| KR | 10-2009-0039503 A | 4/2009 |

(Continued)

OTHER PUBLICATIONS

International Search Report issued in PCT/KR2013/000582, mailed on Apr. 19, 2013.

*Primary Examiner* — Jonathan G Leong
*Assistant Examiner* — James Erwin
(74) *Attorney, Agent, or Firm* — Birch, Stewart, Kolasch & Birch, LLP

(57) ABSTRACT

Disclosed herein is a method of manufacturing a battery cell having an electrode assembly of a cathode/separator/anode structure disposed in a battery case made of aluminum or an aluminum alloy together with an electrolyte in a sealed state, the method including (a) anodizing an entire surface of the battery case in a state in which a connection opening section, to which charge pins used to activate the battery cell are connected, is formed at a bottom of the battery case, (b) mounting the electrode assembly in the battery case and connecting a cap plate to an open upper end of the battery case by laser welding, (c) injecting an electrolyte through an electrolyte injection port of the cap plate and activating the battery cell, and (d) replenishing the electrolyte and sealing the electrolyte injection port.

22 Claims, 6 Drawing Sheets

(51) Int. Cl.
*H01M 10/04* (2006.01)
*H01M 2/34* (2006.01)

(56) References Cited

U.S. PATENT DOCUMENTS

2004/0137322 A1* 7/2004 Hong et al. .............. 429/176
2010/0151282 A1* 6/2010 Koh et al. .............. 429/7
2011/0020672 A1 1/2011 Baek et al.
2011/0136004 A1 6/2011 Kwak et al.

FOREIGN PATENT DOCUMENTS

| KR | 10-2009-0077123 A | 7/2009 |
| KR | 20-2011-0007761 U | 8/2011 |
| KR | 10-2011-0136166 A | 12/2011 |

* cited by examiner

US 9,012,067 B2

METHOD FOR BATTERY CELL OF NOVEL STRUCTURE

CROSS REFERENCE TO RELATED APPLICATIONS

This application is a continuation of PCT International Application No. PCT/KR2013/000582 filed on Jan. 25, 2013, which claims priority under 35 U.S.C 119(a) to Application No. 10-2012-0012096 filed on Feb. 7, 2012 in the Republic of Korea, all of which are hereby expressly incorporated by reference into the present application

TECHNICAL FIELD

The present invention relates to a method of manufacturing a battery cell having a novel structure, and, more particularly, to a method of manufacturing a battery cell having an electrode assembly disposed in a battery case made of aluminum or an aluminum alloy together with an electrolyte in a sealed state, the method including (a) anodizing an entire surface of the battery case in a state in which a connection opening section, to which charge pins used to activate the battery cell are connected, is formed at a bottom of the battery case, (b) mounting the electrode assembly in the battery case and connecting a cap plate to an open upper end of the battery case by laser welding, (c) injecting an electrolyte through an electrolyte injection port of the cap plate and activating the battery cell, and (d) replenishing the electrolyte and sealing the electrolyte injection port.

BACKGROUND ART

As mobile devices have been increasingly developed, and the demand for such mobile devices has increased, the demand for secondary batteries as an energy source for the mobile devices has also sharply increased. Accordingly, much research on secondary batteries satisfying various needs has been carried out.

In terms of the material for batteries, the demand for lithium secondary batteries, such as lithium ion polymer batteries, having high energy density, discharge voltage, and output stability is very high. In terms of the shape of batteries, the demand for prismatic batteries or pouch-shaped batteries, which are thin enough to be applied to products, such as mobile phones, and may be used as batteries for a battery module manufactured by stacking the batteries with high integration is very high.

An electrode assembly for secondary batteries, in which battery reaction is generated, is generally configured to have a structure in which a cathode sheet having a cathode active material applied thereto, an anode sheet having an anode active material applied thereto, and a separator are impregnated with an electrolyte. Based on the structure thereof, an electrode assembly for secondary batteries is classified as a jelly-roll type (wound type) electrode assembly and a stacked type electrode assembly. The jelly-roll type electrode assembly or the stacked type electrode assembly is mounted in a prismatic metal case to manufacture a prismatic battery.

Generally, a prismatic battery is manufactured by mounting an electrode assembly in a prismatic metal case, loading an upper insulator on the open upper end of the prismatic metal case, connecting a cap plate to the upper insulator by welding, injecting an electrolyte through an electrolyte injection port, and sealing the electrolyte injection port.

At this time, a sealed portion of the battery case, in which the battery cell is mounted, is partially bent, and an insulative tape is attached to it or a barcode is printed on it. However, this process is very complicated.

Also, when external impact is applied to a battery pack, a protection circuit module (PCM) may be damaged or dimensional stability of the battery pack may be greatly lowered due to the use of the insulative tapes, which exhibit low mechanical strength.

In order to solve the above problems, therefore, surface treatment may be carried out with respect to the battery case, or a cover having predetermined strength may be mounted to the battery case. In this case, however, welding may not be satisfactorily carried out due to the surface treatment carried out with respect to the battery case when the cap plate is connected to the open upper end of the battery case by laser welding.

Meanwhile, during mass production of a secondary battery, battery cells are temporarily mounted in a charging and discharging device such that the battery cells are charged for activation at a step of placing the battery cells in a pack case, and then the secondary battery is manufactured as a battery pack, which is shipped. Connection terminals of the charging and discharging device, which contact electrode terminals of each battery cell to charge and discharge the battery cell, are generally formed in the shape of a pin. According to automatic mass production, the connection terminals come into contact with the electrode terminals of the battery cell to charge the battery cell and are then separated from the electrode terminals of the battery cell within a short time.

At this time, when the surface of the battery case is treated as previously described, the connection of the electrode terminals and charge and discharge are not satisfactorily achieved at one side at which the electrode pin is formed.

Also, various kinds of combustible a materials are contained in a lithium secondary battery. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as overcharge of the lithium secondary battery or overcurrent in the lithium secondary battery, are loaded on a battery cell in a state in which the safety elements are connected to the battery cell.

Generally, the PCM is electrically connected to the battery cell via conductive nickel plates by welding or soldering. That is, nickel plates are connected to electrode tabs of the PCB by welding or soldering, and the nickel plates are connected to electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. To this end, a plurality of insulative mounting members or other parts is necessary, which complicates an assembly process of the battery pack. In particular, the sum of the height of the PCM and the height of the insulative cap generally reaches 3 mm with the result that a space necessary to receive the battery cell is reduced.

Consequently, there is a high necessity for a bus bar assembly having a novel structure that is capable of improving durability of a battery case and easily performing connection of charge pins and charge and discharge during activation while solving the above-mentioned conventional problems.

DISCLOSURE

Technical Problem

Therefore, the present invention has been made to solve the above problems and other technical problems that have yet to be resolved.

Specifically, it is an object of the present invention to provide a method of anodizing the entire surface of a battery case in a state in which a connection opening section is formed at the bottom of the battery case to easily perform the connection of charge pins.

It is another object of the present invention to provide a secondary battery pack, the number of parts of which is reduced using the above method, the assembly process of which is simplified, and which has a battery capacity greater than that of other battery packs having the same standard.

Technical Solution

In accordance with one aspect of the present invention, the above and other objects can be accomplished by the provision of a method of manufacturing a battery cell having an electrode assembly of a cathode/separator/anode structure disposed in a battery case made of aluminum or an aluminum alloy together with an electrolyte in a sealed state, the method including (a) anodizing an entire surface of the battery case in a state in which a connection opening section, to which charge pins used to activate the battery cell are connected, is formed at a bottom of the battery case, (b) mounting the electrode assembly in the battery case and connecting a cap plate to an open upper end of the battery case by laser welding, (c) injecting an electrolyte through an electrolyte injection port of the cap plate and activating the battery cell, and (d) replenishing the electrolyte- and sealing the electrolyte injection port.

In the method of manufacturing the battery cell according to the present invention, therefore, the connection opening section is provided at the bottom of the battery case before the entire surface of the battery case is anodized. Consequently, it is possible to easily achieve connection between the electrode terminals and the charge pins.

In a concrete example, the step (a) may include (a1) a defatting process of dipping the battery case in a defatting solution, drawing the battery case from the defatting solution, and washing the battery case in water, (a2) an acid cleaning process of dipping the battery case in an acid cleaning solution, drawing the battery case from the acid cleaning solution, and washing the battery case in water, and (a3) an anodizing process of anodizing the surface of the battery case.

That is, durability and corrosion resistance of the battery case are improved through anodizing of the battery case. Also, dyeing of the battery case is possible due to small porosity and fiber property thereof, thereby improving wear resistance and utility of the battery case.

The shape of the connection opening section is not particularly restricted so long as the connection opening section corresponds to the charge pins. For example, the connection opening section may be formed in a circular, oval, or polygonal shape in plan.

The method of forming the connection opening section is not particularly restricted. For example, the connection opening section may be formed by anodizing the battery case in a state in which an insulation material is applied to a portion of the bottom of the battery case or an insulator or an insulation tape is mounted or attached to a portion of the bottom of the battery case and removing the insulation material, the insulator, or the insulation tape.

According to circumstances, the method may further include sealing the connection opening section using an insulation member after the step (d), thereby protecting the battery cell and maintaining electrical insulation of the battery cell.

The material for the insulation member is not particularly restricted so long as the insulation member protects the connection opening section from the outside and maintains electrical insulation of the connection opening section. Preferably, the insulation member is at least one selected from a group consisting of an insulation tape, glue, and coating.

In a preferred example, the battery cell activation process may be performed in a state in which the first charge pin is connected to an upper electrode terminal of the cap plate and the second charge pin is connected to the connection opening section of the battery case.

Consequently, effective charge may be achieved based on stable contact of the second charge pin. i.e. a cathode pin exhibiting cathode polarity.

In another preferred example, the anodizing of the step (a) may be carried out in a state in which an uncoated margin section having a predetermined size is formed so as to extend downward from an outer circumference of the upper end of the battery case. Consequently, it is possible to easily connect the cap plate to the open upper end of the battery case by laser welding.

The uncoated margin section may extend downward from the outer circumference of the upper end of the battery case by a length of 0.5 to 5 mm. If the length of the uncoated margin section is too long, it may be difficult to achieve desired durability of the battery case based on surface treatment, which is not preferable. On the other hand, if the length of the uncoated margin section is too short, it may not be possible to easily carry out laser welding, which is not preferable.

The method of forming the uncoated margin section is not particularly restricted. For example, the uncoated margin section may be formed by anodizing the battery case in a state in which an insulation material is applied to the battery case or an insulator or an insulation tape is mounted or attached to the battery case and removing the insulation material, the insulator, or the insulation tape.

The laser welding of the step (b) may be changed according to process conditions. Preferably, the laser welding of the step (h) is carried out along the outer circumference of the battery cell above the cap plate.

In accordance with another aspect of the present invention, there is provided a battery cell manufactured using the above method. The battery cell may have first and second electrode terminals formed at the top thereof.

In accordance with a further aspect of the present invention, there is provided a secondary battery pack including the above battery cell. Specifically, the secondary battery pack according to the present invention includes the above battery cell, an insulative mounting member having an opening, through which a second electrode terminal of the battery cell is exposed, the insulative mounting member being mounted to a top of the battery cell, a protection circuit module (PCM) including a protection circuit board (PCB), having a protection circuit, loaded on the insulative mounting member, a connection member (A) connected to a first electrode terminal of the battery cell, and a connection member (B) connected to the second electrode terminal of the battery cell via a safety element, the PCB being provided with a through hole, through which the connection member (B) is exposed, and an insulative cap coupled to the upper end of the battery cell to surround the insulative mounting member in a state in which the connection members and the protection circuit board are loaded on the insulative cap, wherein the sum of the height of the PCM and the height of the insulative cap is 0.6 mm or less.

That is, in the secondary battery pack according to the present invention, the connection member (B), exposed through the through hole of the PCB, is electrically connected to the second electrode terminal of the battery cell via the PTC element from the above, and the connection member (A) is electrically connected to the first electrode terminal of the battery cell, in a state in which the PCM is loaded on the insulative mounting member. Consequently, electrical connection is achieved using a simple connection method. Also, the assembly operation is easily performed, thereby greatly improving manufacturing efficiency.

Also, the connection member (A) extending from one end of the PCM is not bent, and the connection member (B) does not need an additional loading space. Consequently, it is possible to minimize a dead space, caused as the connection members are bent for electrical connection of the safety element in the conventional art, and to minimize the sum of the height of the PCM and the height of the insulative cap, thereby manufacturing a secondary battery pack having higher energy density than other secondary battery packs having the same standard.

In a preferred example, the second electrode terminal may be an anode terminal, and the first electrode terminal may be a cathode terminal. For example, a prismatic battery cell is configured to have a structure in which an electrode terminal protruding from the top of the battery cell and a battery case of the battery cell form an anode terminal and a cathode terminal, respectively, and an insulation member is disposed between the anode terminal and the cathode terminal to insulate the anode terminal and the cathode terminal from each other. In the structure of the prismatic battery cell, therefore, the second electrode terminal may be an anode terminal protruding from the top of the battery case, and the first electrode terminal may be a cathode terminal formed at the top of the battery case excluding the anode terminal.

Coupling (electrical connection) between the connection members and the PCM may be achieved using various methods. Preferably, the connection members may be coupled to the bottom of the PCB using surface mount technology (SMT). The SMT prevents paste from remaining at the bottom of the PCB during soldering or the bottom of the PCB from being damage due to heat during welding. Also, the SMT achieved accurate and reliable coupling as compared with a conventional welding or soldering method. For reference, the SMT is widely used to mount surface mount type parts on an electronic board, such as a printed circuit board (PCB).

In a preferred example, the connection member (B) may be coupled to the bottom of the through hole of the PCB. That is, the connection member (B) can be coupled to the safety element connected to the second electrode terminal through the through hole, thereby further simplifying the assembly process and minimizing the thickness of the PCM.

The safety element is an element, which is broken during conduction of overcurrent or the resistance of which increases with the increase of temperature. Preferably, the safety element is positive temperature coefficient (PTC) element. The connection member (B) coupled to the PTC element serves to interrupt current at the upper end of the battery pack when the temperature of the battery pack abruptly rises due to an internal short circuit or the like. However, the safety element is not limited to the PTC element. For example, a bimetal or a fuse may be used as the safety element.

In the above structure, the PTC element may include a PTC body, a PCM coupling part coupled to a top of the PTC body, and a battery cell coupling part coupled to a bottom of the PTC body, and the PCM coupling part may be coupled to the connection member (B) through the through hole of the PCB.

Meanwhile, one end of the connection member (A) may be coupled to a bottom of the PCB in a state in which the end of the connection member (A) extends longer than an outer circumference of the PCB such that the end of the connection member (A) is exposed upward. Preferably, the connection member (A) has a thickness less than that of the insulative mounting member. Consequently, it is possible to easily secure a space necessary to locate the connection member (A) between one end of the PCM and one end of the top of the battery cell.

In another preferred example, the secondary battery pack may further include an auxiliary mounting member having one end coupled to a bottom of the PCB and the other end coupled to the top of the battery cell is provided such that the PCB is stably mounted to the battery cell.

Specifically, the auxiliary mounting member may be coupled to a position opposite to the connection member (A), and the auxiliary mounting member may be coupled to the bottom of the PCB in a state in which the auxiliary mounting member extends longer than the outer circumference of the PCB such that one end of the auxiliary mounting member is exposed upward. Consequently, the auxiliary mounting member is stably fixed to the PCB while minimizing a dead space.

The material for the auxiliary mounting member is not particularly restricted. Preferably, the auxiliary mounting member is formed of a metal plate, such as a nickel plate.

The coupling of the insulative mounting member to the top of the battery case may be achieved, for example, by bonding, thereby achieving easiness in assembly process of the battery pack and securing stable coupling state.

The insulative cap may have a predetermined height sufficient for at least a portion of the insulative cap to surround the outer circumference of the upper end of the battery cell in a state in which the insulative cap is mounted to the battery cell. Preferably, the insulative cap has a height of 0.4 mm or less. Consequently, the height of the insulative cap is minimized as compared with the height of a conventional insulative cap, and therefore, it is possible to manufacture a secondary battery pack having higher energy density than other secondary battery packs having the same standard.

The secondary battery pack according to the present invention may be variously applied irrespective of the kind or external shape of the battery cell. Preferably, the secondary battery pack according to the present invention is applied to a battery pack including a prismatic secondary battery as a battery cell.

Effects of the Invention

As is apparent from the above description, in a battery cell according to the present invention, the entire surface of a battery case is anodized in a state in which a connection opening section is provided at the bottom of the battery case and an uncoated margin section is provided at the upper end of the battery case, thereby improving durability of the battery cell and easily performing connection of charge pins and laser welding of a cap plate.

Also, in a secondary battery pack including the battery cell with the above stated construction, the sum of the height of a PCM and the height of an insulative cap is minimized, and therefore, it is possible to increase a battery capacity as compared with other battery packs having the same standard.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1:
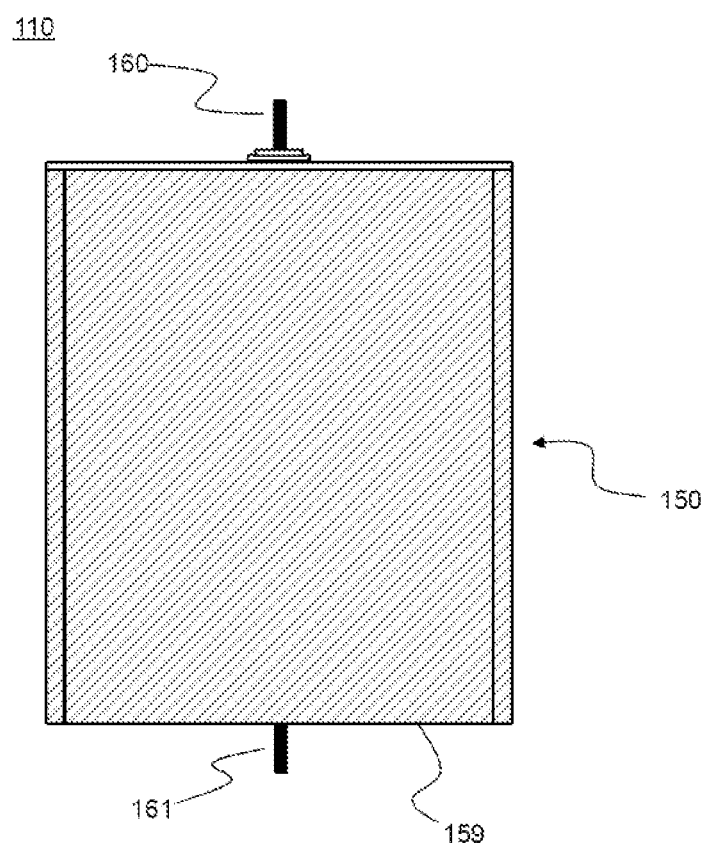
FIG. 1 is a front view showing a battery cell according to an embodiment of the present invention to which connection pins, which are used during a charging process to activate the battery cell, are connected.
Figure 2:
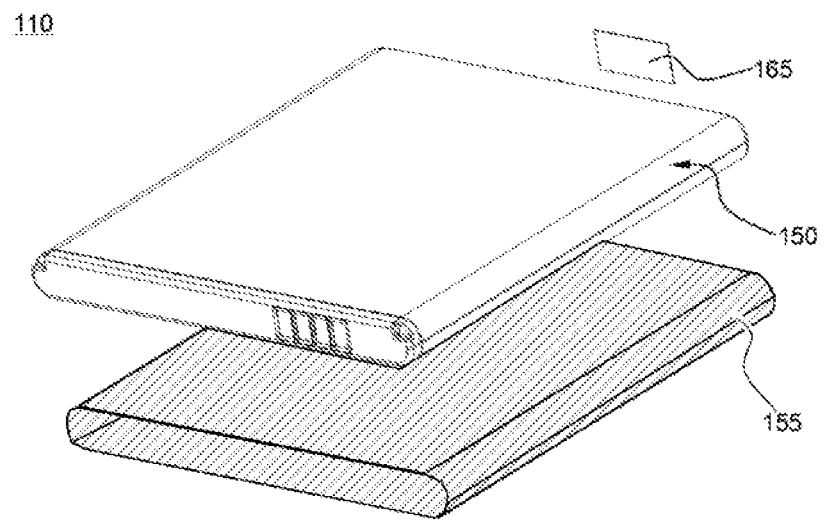
FIG. 2 is an exploded perspective view showing a battery cell, an anodized part, and an insulation tape of a secondary battery pack according to an embodiment of the present invention.
Figure 3:
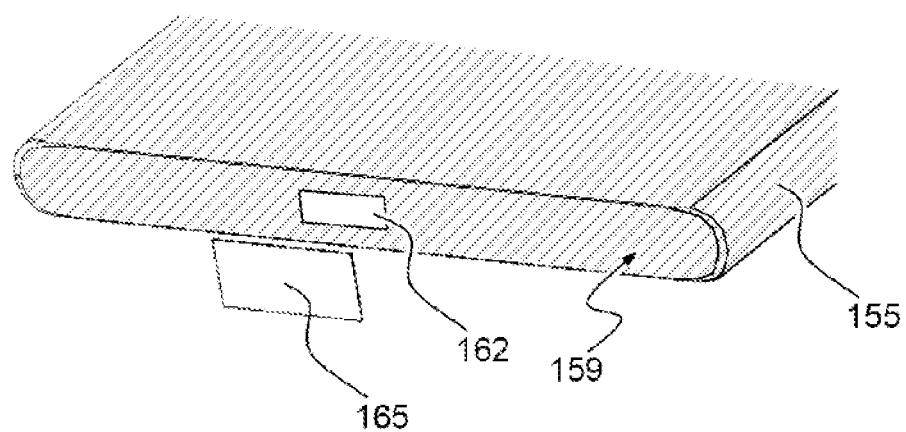
FIG. 3 is a partial perspective view showing the bottom of the battery cell of FIG. 2.
Figure 4:
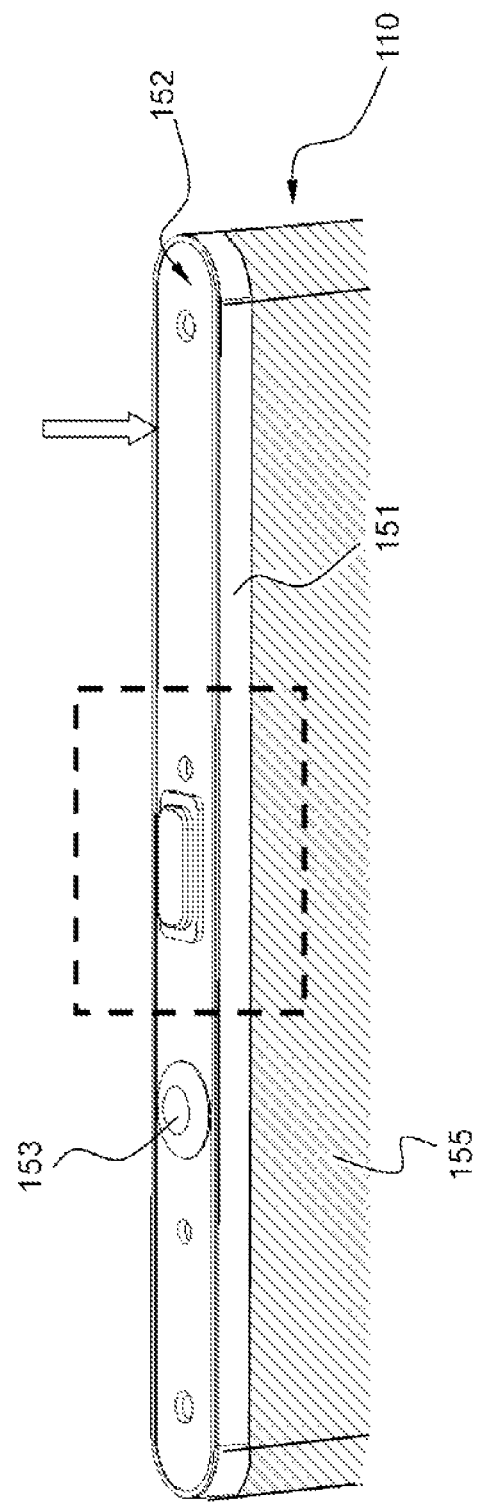
FIG. 4 is a partial perspective view showing the upper end of the battery cell according to the embodiment of the present invention.

FIG. 1 is a front view showing a battery cell to which connection pins, which are used during a charging process to activate the battery cell, are connected, FIG. 2 is an exploded perspective view showing the battery cell, an anodized part, and an insulation tape, FIG. 3 is a partial perspective view showing the bottom of the battery cell, and FIG. 4 is a partial perspective view showing the upper end of the battery cell.

Referring to these drawings, a battery cell 110 having an electrode assembly of a cathode/separator/anode structure disposed in a battery case 150 made of aluminum together with an electrolyte in a sealed state is manufactured as follows. First, the entire surface of the battery case 150 is anodized (155) in a state in which a connection opening section 162, to which charge pins 160 and 161 used to activate the battery cell 110 are connected, is formed at the bottom 159 of the battery case 150. Subsequently, the electrode assembly is mounted in the battery case 150, a cap plate 152 is connected to the open upper end of the battery case 150 by laser welding, an electrolyte is injected through an electrolyte injection port 153 of the cap plate 152, and the battery cell is activated. Subsequently, the electrolyte is replenished, and then the electrolyte injection port 153 is sealed.

The connection opening section 162 is formed in a quadrangular shape in plan. Alternatively, the connection opening section 162 may be formed in various shapes in plan.

Also, the connection opening section 162 is formed by anodizing (155) the battery case 150 in a state in which an insulation material (not shown) is applied to a portion of the bottom of the battery case 150 and removing the insulation material.

Finally, the connection opening section 162 is sealed using an insulation member 165, such as an insulation tape.

The battery cell activation process is performed in a state in which the first charge pin 160 is connected to an upper electrode terminal 111 of the cap plate 152 and the second charge pin 161 is connected to the connection opening section 162 of the battery case 150.

Consequently, the connection of the second charge pin 161 is easily achieved by the provision of the connection opening section 162.

Figure 5:
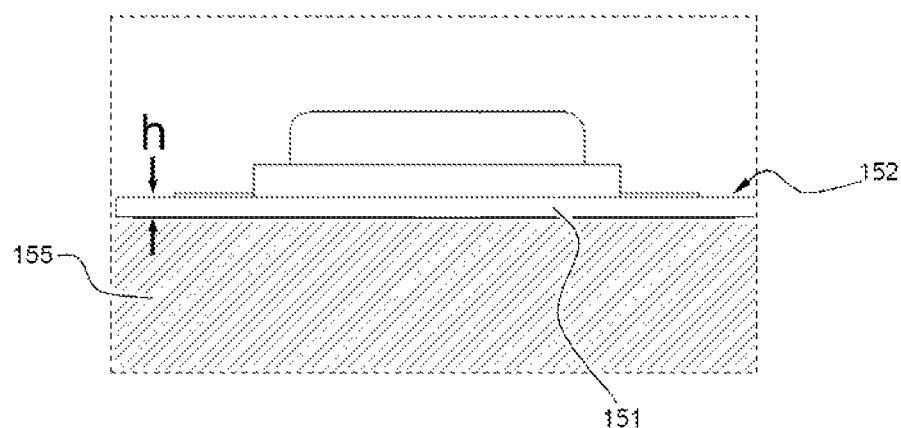
FIG. 5 is a partial side view showing the upper end of the battery cell of FIG. 4.

FIG. 5 is a partial side view showing the upper end of the battery ell of FIG. 4.

Referring to FIG. 5 together with FIGS. 1 to 4, the entire surface of the battery case 150 is anodized (155) (see FIG. 2) in a state in which an uncoated margin section 151 having a length h of about 3 mm is provided downward from the outer circumference of the upper end of the battery case 150. The uncoated margin section 151 is formed by anodizing the battery case 150 in a state in which an insulation material (not shown) is temporarily applied to the battery case 150 and removing the insulation material.

Laser welding is carried out along the outer circumference of the battery cell 110 above the cap plate 152 (see an arrow shown in FIG. 4). The laser welding of a cap assembly is easily carried out by the provision of the uncoated margin section 151.

Figure 6:
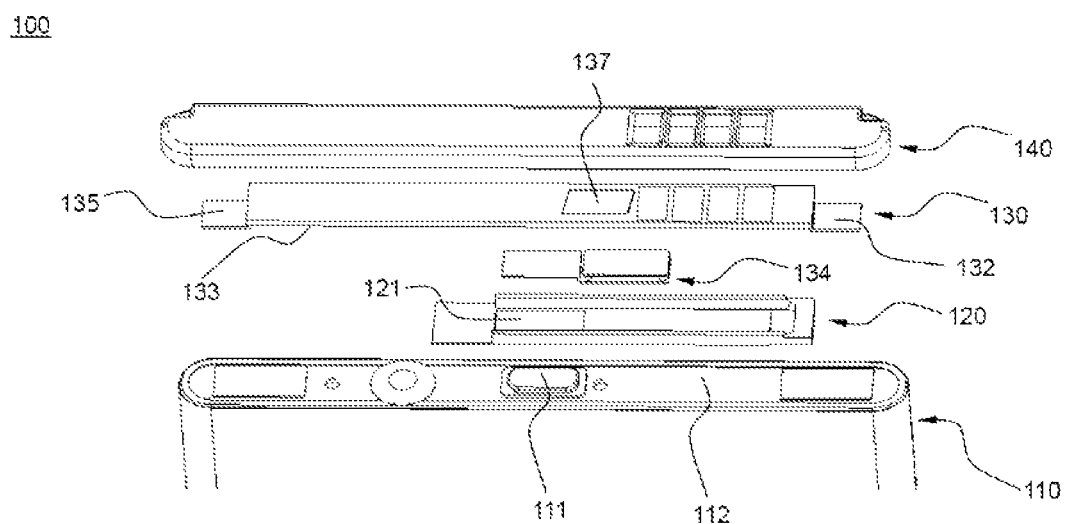
FIG. 6 is an exploded perspective view showing the upper end of a battery cell and an insulative cap, on which an insulative mounting member is loaded, of a secondary battery pack according to another embodiment of the present invention.
Figure 7:
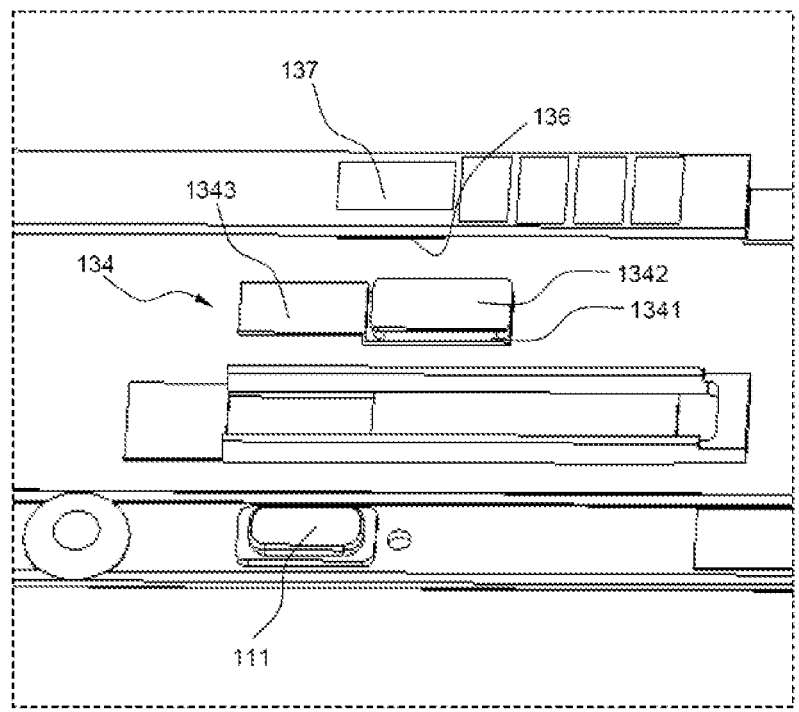
FIG. 7 is a partially enlarged side view of FIG. 6.
Figure 8:
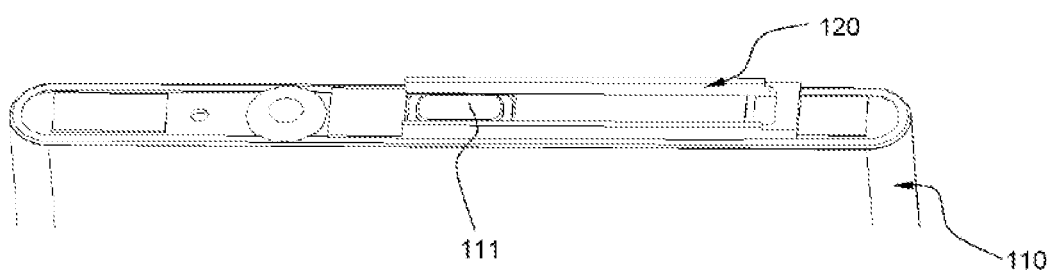
FIG. 8 is a partial perspective view showing a state in which the insulative mounting member is mounted to the upper end of the battery cell of FIG. 6.
Figure 9:
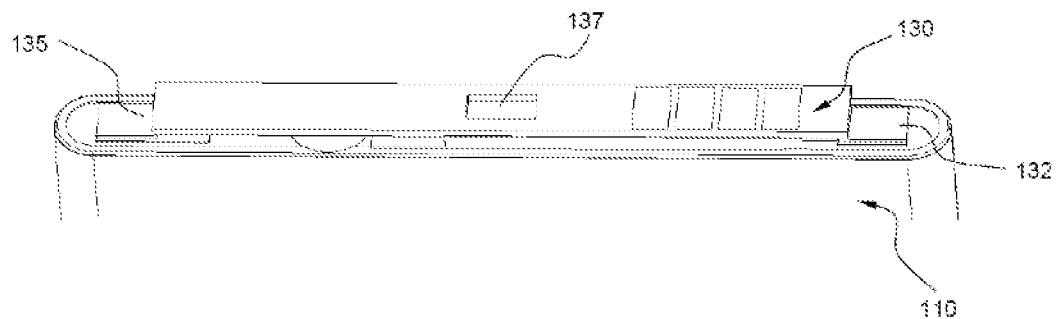
FIG. 9 is a partial perspective view showing a state in which a protection circuit module (PCM) is mounted at the structure of FIG. 8.
Figure 10:
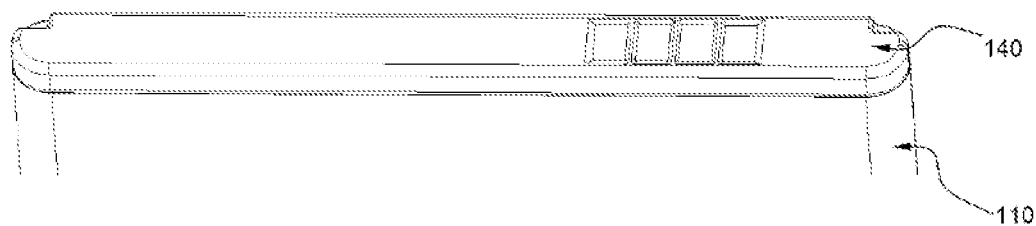
FIG. 10 is a partial perspective view showing a state in which the insulative cap is mounted at the structure of FIG. 9.

FIG. 6 is an exploded perspective view showing the upper end of a battery cell and an insulative cap, on which an insulative mounting member is loaded, of a secondary battery pack according to an embodiment of the present invention, FIG. 7 is a partially enlarged side view of FIG. 6, FIG. 8 is a partial perspective view showing a state in which the insulative mounting member is mounted to the upper end of the battery cell, FIG. 9 is a partial perspective view showing a state in which a protection circuit module (PCM) is mounted to the upper end of the battery cell, and FIG. 10 is a partial perspective view showing a state in which the insulative cap is mounted to the upper end of the battery cell.

Referring to these drawings, a secondary battery pack 100 is configured to have a structure including a battery cell 110, an electrically insulative mounting member 120 mounted to the top of the battery cell 110, a PCM 130, and an insulative cap 140 mounted to the upper end of the battery cell 110 while surrounding the insulative mounting member 120.

The battery cell 110 is configured to have a structure in which an electrode assembly of a cathode/separator/anode, structure is mounted in a battery case 150 made of aluminum together with an electrolyte in a sealed state, an anode terminal 111 protrudes from the middle of the top of the battery cell 110, and a cathode terminal 112 is formed at the top of the battery cell 110 excluding the anode terminal 111.

The insulative mounting member 120 is provided with an opening 121, through which the anode terminal 111 of the battery cell is exposed.

The PCM 130 includes a protection circuit board (PCB) 133 loaded on the insulative mounting member 120, the PCB 133 having a protection circuit, a connection member 132 connected to the cathode terminal 112, and a connection member 136 connected to the anode terminal 111 via a positive temperature coefficient (PTC) element 134. The PCB 133 is provided with a through hole 137, through which the connection member 136 is exposed.

The connection member 36 is coupled to the bottom of the through hole 137 of the PCB 133.

Referring to FIG. 8, the PTC element 134 includes a PTC body 1341, a PCM coupling part 1342 coupled to the top of the PTC body 1341, and a battery cell coupling part 1343 coupled to the bottom of the PTC body 1341. The PCM coupling part 1342 is coupled to the connection member 136 through the through hole 137.

Meanwhile, one end of the connection member 132 is coupled to the bottom of the PCB 133 by surface mount technology (SMT) in a state in which the end of the connection member 132 extends longer than the outer circumference of the PCB 133 such that the end of the connection member 132 is exposed upward.

An auxiliary mounting member 135, formed of a nickel plate, having one end coupled to the bottom of the PCB 133 and the other end coupled to the top of the battery cell 110 is provided such that the PCB 133 can be stably mounted to the battery cell 110. The auxiliary mounting member 135 is coupled to a position opposite to the connection member 132.

The insulative cap 140 is made of an electrically insulation material. The insulative cap 140 is formed to surround the insulative mounting member 120 in a state in which the connection members 132 and 136 and the protection circuit board 133 are loaded on the insulative cap 140.

Also, the insulative cap 140 is coupled to the top of the battery cell 110 by bonding. The insulative cap 140 has a height of about 0.4 mm or less.

In the secondary battery pack 100 according to the present invention, therefore, the connection member 136, exposed through the through hole 137 of the PCB 133, is electrically connected to the anode terminal 111 of the battery cell 110 via the PTC element 134 from the above, and the connection member 132 is electrically connected to the cathode terminal 112 of the battery cell 110, in a state in which the PCM 130 is loaded on the insulative mounting member 120. Consequently, electrical connection is achieved using a simple connection method. Also, the sum of the height of the PCM 130 and the height of the insulative cap 140 is about 0.6 mm or less. Consequently, it is possible to manufacture a secondary battery pack having higher energy density than other secondary battery packs having the same standard.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a battery cell having an electrode assembly of a cathode/separator/anode structure disposed in a battery case made of aluminum or an aluminum alloy together with an electrolyte in a sealed state, the method comprising:
    (a) anodizing an entire surface of the battery case in a state in which a connection opening section, to which charge pins used to activate the battery cell are connected, is formed at a bottom of the battery case;
    (b) mounting the electrode assembly in the battery case and connecting a cap plate to an open upper end of the battery case by laser welding;
    (c) injecting an electrolyte through an electrolyte injection port of the cap plate and activating the battery cell; and
    (d) replenishing the electrolyte and sealing the electrolyte injection port.

2. The method according to claim 1, wherein the step (a) comprises:
    (a1) a defatting process of dipping the battery case in a defatting solution, drawing the battery case from the defatting solution, and washing the battery case in water;
    (a2) an acid cleaning process of dipping the battery case in an acid cleaning solution, drawing the battery case from the acid cleaning solution, and washing the battery case in water;
    and
    (a3) an anodizing process of anodizing the surface of the battery case.

3. The method according to claim 1, wherein the connection opening section is formed in a circular or polygonal shape in plan.

4. The method according to claim 1, wherein the connection opening section is formed by anodizing the battery case in a state in which an insulation material is applied to a portion of the bottom of the battery case or an insulator or an insulation tape is mounted or attached to a portion of the bottom of the battery case and removing the insulation material, the insulator, or the insulation tape.

5. The method according to claim 1, further comprising sealing the connection opening section using an insulation member after the step (d).

6. The method according to claim 5, wherein the insulation member is at least one selected from a group consisting of an insulation tape, glue, and coating.

7. The method according to claim 1, wherein the battery cell activation process is performed in a state in which the first charge pin is connected to an upper electrode terminal of the cap plate and the second charge pin is connected to the connection opening section of the battery case.

8. The method according to claim 1, wherein the anodizing of the step (a) is carried out in a state in which an uncoated margin section having a predetermined size is formed so as to extend downward from an outer circumference of the upper end of the battery case.

9. The method according to claim 8, wherein the uncoated margin section extends downward from the outer circumference of the upper end of the battery case by a length of 0.5 to 5 mm.

10. The method according to claim 8, wherein the uncoated margin section is formed by anodizing the battery case in a state in which an insulation material is applied to the battery case or an insulator or an insulation tape is mounted or attached to the battery case and removing the insulation material, the insulator, or the insulation tape.

11. The method according to claim 1, wherein the laser welding of the step (b) is carried out along an outer circumference of the battery cell above the cap plate.

12. A battery cell manufactured using a method according to claim 1.

13. The battery cell according to claim 12, wherein the battery cell has first and second electrode terminals formed at a top thereof.

14. A secondary battery pack comprising:
    a battery cell according to claim 12;
    an insulative mounting member having an opening, through which a second electrode terminal of the battery cell is exposed, the insulative mounting member being mounted to a top of the battery cell;

a protection circuit module (PCM) comprising a protection circuit board (PCB), having a protection circuit, loaded on the insulative mounting member, a connection member (A) connected to a first electrode terminal of the battery cell, and a connection member (B) connected to the second electrode terminal of the battery cell via a safety element, the PCB being provided with a through hole, through which the connection member (B) is exposed; and an insulative cap coupled to an upper end of the battery cell to surround the insulative mounting member in a state in which the connection members and the protection circuit board are loaded on the insulative cap, wherein a sum of a height of the PCM and a height of the insulative cap is 0.6 mm or less.

15. The secondary battery pack according to claim 14, wherein the second electrode terminal is an anode terminal protruding from a middle of the top of the battery cell, and the first electrode terminal is a cathode terminal formed at the top of the battery cell excluding the anode terminal.

16. The secondary battery pack according to claim 14, wherein the connection members are coupled to a bottom of the PCB using surface mount technology (SMT).

17. The secondary battery pack according to claim 14, wherein the connection member (B) is coupled to a bottom of the through hole of the PCB.

18. The secondary battery pack according to claim 14, wherein the safety element is a positive temperature coefficient (PTC) element, the PTC element comprising a PTC body, a PCM coupling part coupled to a top of the PTC body, and a battery cell coupling part coupled to a bottom of the PTC body, the PCM coupling part being coupled to the connection member (B) through the through hole of the PCB.

19. The secondary battery pack according to claim 14, wherein one end of the connection member (A) is coupled to a bottom of the PCB in a state in which the end of the connection member (A) extends longer than an outer circumference of the PCB such that the end of the connection member (A) is exposed upward.

20. The secondary battery pack according to claim 14, further comprising an auxiliary mounting member having one end coupled to a bottom of the PCB and the other end coupled to the top of the battery cell is provided such that the PCB is stably mounted to the battery cell.

21. The secondary battery pack according to claim 20, wherein the auxiliary mounting member is coupled to a position opposite to the connection member (A).

22. The secondary battery pack according to claim 20, wherein the auxiliary mounting member is coupled to the bottom of the PCB in a state in which the auxiliary mounting member extends longer than an outer circumference of the PCB such that one end of the auxiliary mounting member is exposed upward.

* * * * *